United States Patent
Canepa

(10) Patent No.: US 12,473,046 B2
(45) Date of Patent: Nov. 18, 2025

(54) LAMP FOR A SADDLE-RIDE TYPE VEHICLE HAVING A DIFFUSER WITH RIDGES AND VALLEYS

(71) Applicant: PIAGGIO & C.SPA, Pontedera (IT)

(72) Inventor: Marco Canepa, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 0 days.

(21) Appl. No.: 18/866,957

(22) PCT Filed: May 17, 2023

(86) PCT No.: PCT/IB2023/055086
§ 371 (c)(1),
(2) Date: Nov. 18, 2024

(87) PCT Pub. No.: WO2023/223239
PCT Pub. Date: Nov. 23, 2023

(65) Prior Publication Data
US 2025/0346316 A1    Nov. 13, 2025

(30) Foreign Application Priority Data
May 18, 2022   (IT) .................. 102022000010295

(51) Int. Cl.
*B62J 6/026*    (2020.01)
*B60Q 1/00*    (2006.01)
(Continued)

(52) U.S. Cl.
CPC .......... *B62J 6/026* (2020.02); *B60Q 1/0011* (2013.01); *B60Q 1/2696* (2013.01); *B60Q 1/38* (2013.01); *B62J 6/055* (2020.02); *B62J 6/20* (2013.01); *F21S 41/2805* (2024.05); *F21S 41/285* (2018.01); *F21S 41/32* (2018.01); *B60Q 2400/30* (2013.01); *F21W 2107/13* (2018.01)

(58) Field of Classification Search
CPC ............................ F21S 43/26; F21S 43/26241
See application file for complete search history.

(56) References Cited

U.S. PATENT DOCUMENTS 7,281,833 B2 * 10/2007 Akiyama ............... F21S 43/14
                                                        362/348
2006/0044825 A1    3/2006 Sa
2009/0185389 A1    7/2009 Tessnow

FOREIGN PATENT DOCUMENTS

DE    102017114476 A1    1/2019
EP         1411291 A2    4/2004
(Continued)

OTHER PUBLICATIONS

International Search Report and Written Opinion received for PCT Application No. PCT/IB2023/055086 on Aug. 8, 2023, 13 pgs.

*Primary Examiner* — Robert J May
(74) *Attorney, Agent, or Firm* — Merchant & Gould P.C.

(57) ABSTRACT

A lamp for a saddle-ride type vehicle includes a casing having a front aperture and a light source attached to the casing. A reflector is configured to reflect the light emitted by the light source, and a diffuser is arranged in front of the reflector. A clear cover attaches to the casing and defines, together with the casing, a space in which the light source, the reflector, and the diffuser are arranged. The diffuser is shaped to include mutually alternating ridges and valleys. A vehicle of the type with a saddle includes the lamp.

15 Claims, 3 Drawing Sheets

(51) Int. Cl.
*B60Q 1/26* (2006.01)
*B60Q 1/38* (2006.01)
*B62J 6/055* (2020.01)
*B62J 6/20* (2006.01)
*F21S 41/20* (2018.01)
*F21S 41/32* (2018.01)
*F21W 107/13* (2018.01)

(56) References Cited

FOREIGN PATENT DOCUMENTS

| | | | |
|---|---|---|---|
| EP | 3096072 | A1 | 11/2016 |
| EP | 3707028 | A1 | 9/2020 |
| FR | 3058370 | A1 | 5/2018 |
| JP | 2004139903 | A | 5/2004 |
| JP | 2014038733 | A | 2/2014 |
| JP | 2015060797 | A | 3/2015 |
| JP | 2015130264 | A | 7/2015 |
| WO | 2017052478 | A1 | 3/2017 |

\* cited by examiner

LAMP FOR A SADDLE-RIDE TYPE VEHICLE HAVING A DIFFUSER WITH RIDGES AND VALLEYS

CROSS-REFERENCE TO RELATED APPLICATIONS

The present application is a National Stage Filing of PCT International Application No. PCT/IB2023/055086 filed on May 17, 2023, which claims priority to Italian application No. 102022000010295, filed with the Italian Patent Office on May 18, 2022, which applications are incorporated herein by reference in their entirety.

TECHNOLOGICAL FIELD

The present invention relates to the field of lights of saddle-ride type vehicles, in particular the field of turn signal lamps for motorcycles and scooters.

BACKGROUND ART

The prior art comprises several known solutions for increasing the light emitted by a light source. Vehicle lamps or headlights are known, comprising reflecting surfaces to increase the width of the light beam emitted by the light source.

There are also light guides, i.e., devices or systems adapted to guide the light emitted by the light source in a particular direction or on a particular surface. A solution to this effect is provided by document US20090185389A1, which describes a plurality of LEDs, each associated with a respective light deflector to direct the light emitted by the LED in a preferred direction.

Vehicle lamps provided with diffusers also exist in the prior art. An example to this effect is provided by document US20060044825A1, which describes a diffuser configured to diffuse light so as to conceal the texture of the light guide panel at the back.

A further known solution is described in EP3707028A1, where a non-transparent mask comprising a transparent window allows creating a predetermined lighting effect by means of the shadow and light areas created by the non-transparent and transparent portions of the mask, respectively.

The solutions of the prior art do not provide lamps, or turn signal lamps, in which a diffuser inside the lamp, independent of the clear cover, allows diffusing the light emitted by a light source distinctively. In particular, there are no known solutions for creating areas of higher or lower illumination of a lamp using only one diffuser, i.e., without employing masks adapted to shield part of the light beam created by the light source or a light source for each illuminated area.

SUMMARY

It is a first object of the present invention to solve the aforesaid drawbacks of the prior art by means of a lamp for a saddle-ride type vehicle, where the lamp comprises a casing, a light source, a reflector, a diffuser, and a clear cover. In particular, the casing comprises a front aperture, the light source is attached to the casing, the reflector is configured to reflect the light emitted by the light source, the diffuser is arranged in front of the reflector, and the clear cover is attached to the casing and is configured to define, together with the casing, a space in which the light source, the reflector, and the diffuser are arranged. The diffuser is shaped so as to comprise a plurality of mutually alternating ridges and valleys. This specific shape of the diffuser allows diffusing light in a differentiated manner over the diffuser itself, thus creating lighting effects that a flat or curved type diffuser cannot generate. These lighting effects are achieved by the diffuser thus designed regardless of the arrangement of the light sources behind the diffuser and regardless of the reflector outline.

Preferably, the diffuser can be made of a transparent material comprising matt transparent portions and glossy transparent portions. The use of transparent and matt portions allows further emphasizing the spread of light, thus creating areas of the diffuser more illuminated and areas less illuminated.

Advantageously, the matt transparent portions can be the valleys of the diffuser. The effect of absorbing and shielding the light reflected by the reflector at the valleys is thus increased. In particular, the matt transparent portions can be located on the valleys of the diffuser.

In particular, the glossy transparent portions can be the ridges of the diffuser. The effect of increasing the brightness of the ridges is thus improved. In particular, the glossy transparent portions can be located on the ridges of the diffuser.

Preferably, at least one ridge can comprise a protuberance shaped so as to extend outwards therefrom. This protuberance allows concentrating the light diffused by the diffuser in a specific portion thereof, thus creating an additional area in which the illuminating effect is increased.

In particular, the outer surface of the protuberance can be matt and transparent to distribute light more evenly over the protuberance itself.

Preferably, the protuberance can have a tapered shape. Even more preferably, the protuberance can have a prismatic shape. These protuberance shapes allow obtaining a highlighting effect of the brightness reflected by the reflector.

Advantageously, the ridges can be linear ridges and/or the valleys can be linear valleys. This straight shape of the ridges and/or valleys allows improving the aesthetic appearance of the lamp both when it is on and when it is off. This aesthetic effect allows for a better identifiability of the lamp among the additional lamps available on the market and a consequent recognizability of the vehicle that adopts it.

Preferably, the light source can comprise a plurality of light spots and the reflector can comprise a plurality of reflecting surfaces associated with said light spots. This internal lamp arrangement allows optimizing the reflection of light emitted by a plurality of light spots in a main lighting direction.

In particular, the light source can have a flat body and the light spots can be attached on one side of the flat body or on two opposite sides of the flat body. The lamp can thus provide one type of light on one side and another type of light on the other side of the flat body. Preferably, said light spots are LEDs so as to optimize the energy consumption of the light source.

Advantageously, the reflector can comprise a transversal septum shaped so as to separate a first group of reflecting surfaces associated with a first group of light spots from a second group of reflecting surfaces associated with a second group of light spots. This partitioning of the reflector by means of a transversal septum allows dedicating a first portion of the lamp to one type of illumination and a second portion of the lamp to another type of illumination.

Preferably, the first group of light spots can be configured to emit a colored light beam and the second group of light spots can be configured to emit a white light beam. A first portion of the lamp can thus be used as a position light or day running light (DRL), while a second portion of the lamp can be used as a turn signal lamp.

In particular, the clear cover can be configured to fully cover and close the front aperture of the casing in a waterproof manner. This mode of closing the casing allows making the lamp watertight and thus resistant to bad weather. Moreover, this type of closure allows not to leave externally visible edges of the casing.

Advantageously, the casing can comprise an internal reflecting surface and attaching means to connect the lamp to the vehicle. The reflecting surface of the casing allows directing the light beam towards the front aperture in an improved manner, i.e., distributing the exiting light beam more evenly.

Preferably, the lamp can comprise a turn signal lamp. The lamp according to the present invention finds the optimal use thereof as a turn signal lamp. In particular, if the ridges are oriented horizontally, the optical effect created by them allows increasing the perception of the turning direction indicated by the signal lamp.

It is a second object of the present invention to provide a saddle-ride type vehicle comprising at least one lamp according to the aforesaid first object. This type of lamp is particularly useful in a saddle-ride type vehicle, since the lamp size of motorcycles and scooters is always quite small, and vice versa, this type of vehicle needs to stand out well when circulating on the road. In particular, the turn signal lamps of motorcycles and scooters are highly small and need to be seen by following or preceding vehicles to avoid accidents. A saddle-ride type vehicle provided with this type of lamp achieves the above result.

These and other advantages will become more apparent from the following description of an embodiment thereof given by way of non-limiting indication with reference to the accompanying drawings.

DETAILED DESCRIPTION

Figure 1:
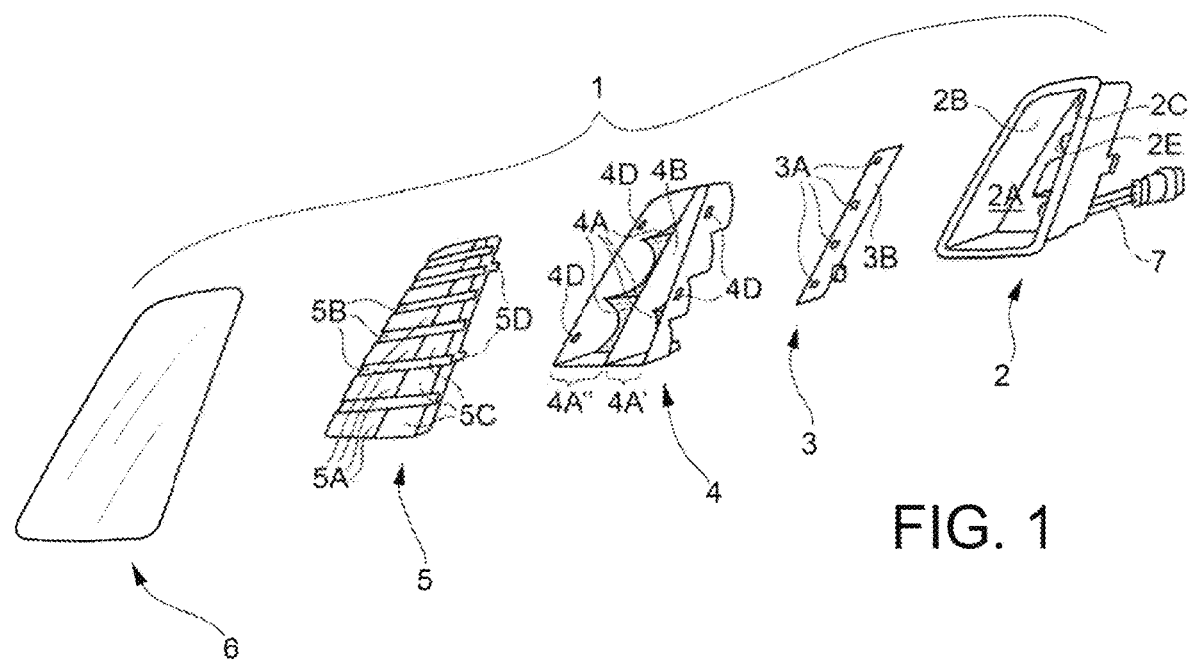
FIG. 1 shows an exploded view of a first embodiment of the lamp according to the present invention.

The following description of one or more embodiments of the invention refers to the accompanying drawings. The same reference numerals in the drawings identify equal or similar elements. The subject of the invention is defined by the appended claims. The technical details, structures, or features of the solutions described below can be mutually combined in any manner.

Reference numeral 1 in FIGS. 1, 3, 5, and 6 indicates a lamp.

Figure 3:
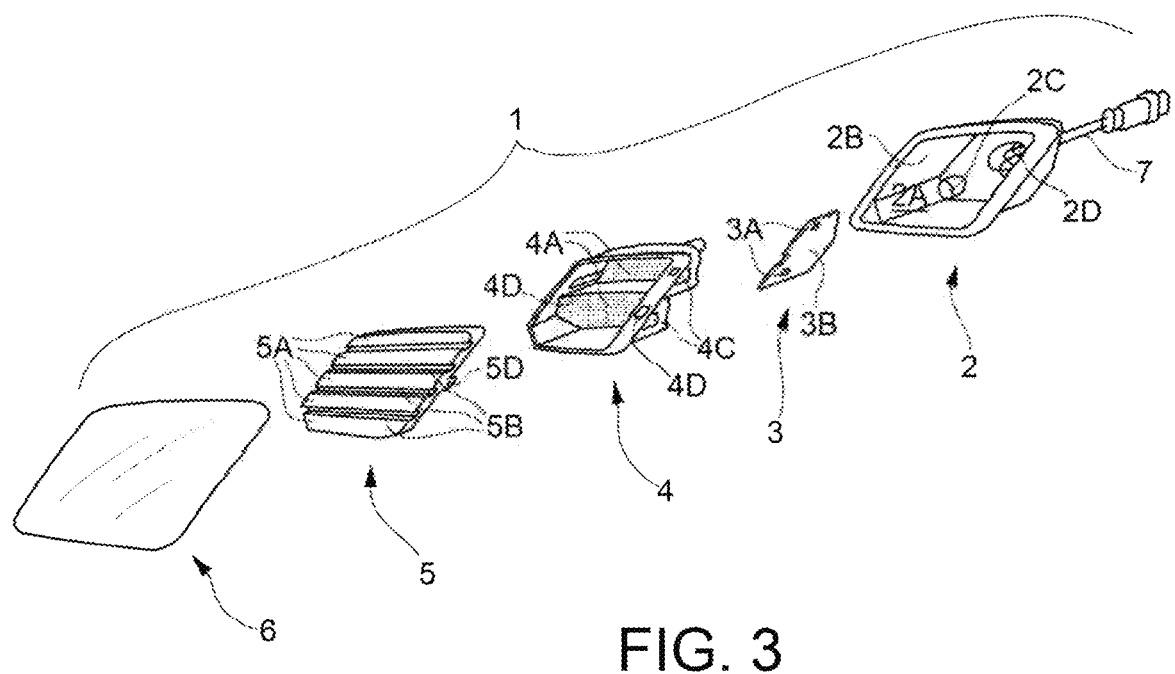
FIG. 3 shows an exploded view of a second embodiment of the lamp according to the present invention.

Specifically, FIG. 1 shows a lamp 1 according to a first embodiment of the present invention, while FIG. 3 shows a lamp 1 according to a second embodiment of the present invention.

In the first embodiment, the lamp 1 comprises a turn signal lamp and a position light, preferably a DRL (Day Running Light). The shape and details of the lamp 1 to achieve this result are better explained below.

In the second embodiment, the lamp 1 comprises only one turn signal lamp.

As shown in FIGS. 1 and 3, the lamp 1 comprises a casing 2 having a front aperture 2A. The casing 2 further comprises at least one hole 2D, seen in FIG. 3, in the opposite wall thereof with respect to the aperture 2A. The hole 2D allows the passage of the electric cables 7 supplying the light source 3. The electric cables 7 are appropriately provided with a gasket (not seen in the figures) arranged at said hole 2D.

The light source 3 comprises a flat body 3B adapted to support a plurality of light spots 3A and the electronics of the light source 3. The light spots 3A are light-emitting diodes connected to the flat body 3B. The overall shape of the light source is flat, as shown in FIGS. 1 and 3.

The casing 1 is shaped so as to comprise housing slots in which the flat body 3B of the light source 3 is inserted. These slots are sized to slightly pinch the flat body 3B inserted therein, thus avoiding the use of screws. Alternatively, the flat body 3B can interlock with appropriate teeth of the casing 1 to achieve a quick connection.

The casing 2 further comprises attaching means 2C for connecting the lamp 1 to the vehicle 10, such as holes on the casing or a threaded protuberance.

The casing 2 further comprises a vent valve 2E, as shown in FIG. 1. The vent valve 2E allows preventing low pressures or overpressures inside the casing 2.

As shown in FIGS. 1 and 3, the lamp 1 further comprises a reflector 4 provided with a plurality of reflecting surfaces 4A. The reflecting surfaces 4A have a parabolic shape and can comprise a plurality of faces to multiply the reflecting effect. The reflecting surfaces 4A are covered with a highly reflecting material, such as chrome plating.

As shown in FIGS. 3, the reflector 4 comprises one or more apertures 4C shaped and arranged so that when the reflector 4 and the light source 3 are inserted into the casing 2, each aperture 4C surrounds a light spot 3A of the light source 3.

The reflector 4 of the first embodiment comprises a transversal septum 4B adapted to divide the reflecting surface 4A of the reflector 4 into two areas. A first group of reflecting surfaces 4A' and a second group of reflecting surfaces 4A" are thus created. In essence, the reflector 4 is divided into two sub-reflectors by the transversal septum 4B, as shown in FIG. 1.

Indeed, the first embodiment comprises a light source 3 comprising light spots 3A adapted to emit a first-color light on one side of the flat body 3B and other light spots 3A adapted to emit a second-color light on the opposite side of the flat body 3B. Finally, referring to FIG. 1, the light spots 3A on the right side of the flat body 3B (not shown in FIG. 1) are configured to emit an orange light, while the light spots 3A on the left side of the flat body 3B (shown in FIG. 1) are configured to emit a white light. Indeed, the right portion of the lamp 1, i.e., that comprising the first group of reflecting surfaces 4A', is configured to act as a position light or DRL, while the left portion, i.e., that comprising the second group of reflecting surfaces 4A", is configured to act as a turn signal lamp. Note that the turn signal lamp shown in FIG. 1 is the left front turn signal lamp on the vehicle 10, while the turn signal lamp in FIG. 3 is the right rear turn signal lamp on the vehicle 10.

The second embodiment shown in FIG. 3 is configured to act only as a turn signal lamp of the vehicle 10.

Once the light source 3 and the reflector 4 have been inserted into the casing 2, a diffuser 5 is placed in front of the reflector 4, as shown in FIGS. 1 and 3.

Figure 2:
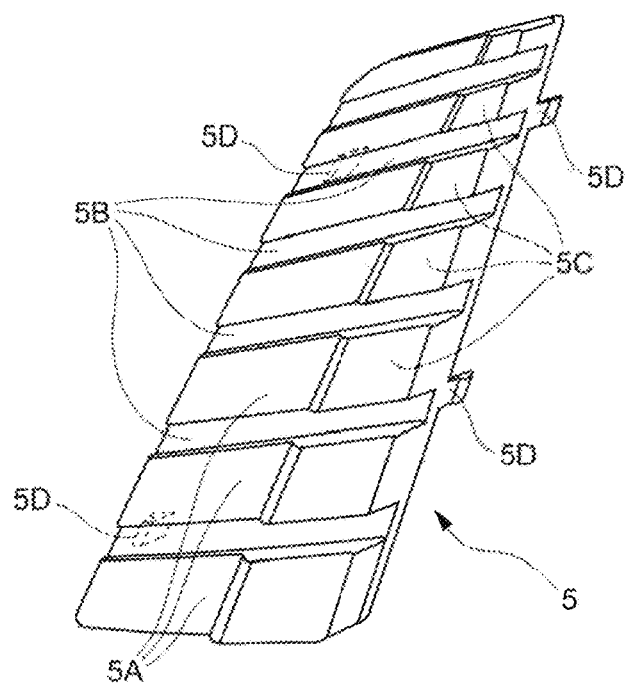
FIG. 2 shows an axonometric view of a first type of diffuser according to the present invention.
Figure 4:
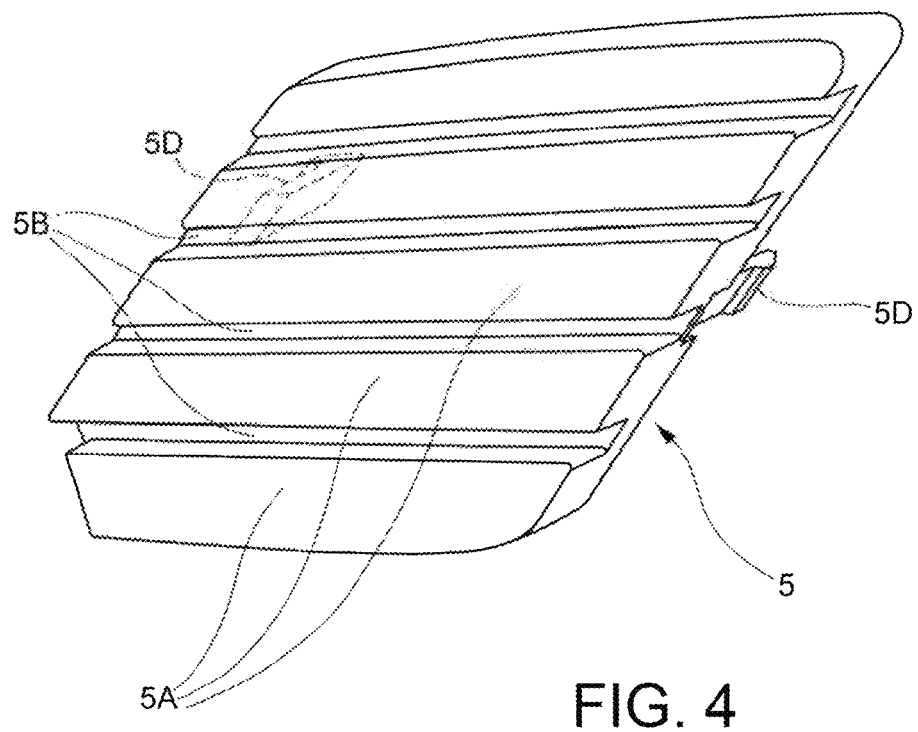
FIG. 4 shows an axonometric view of a second type of diffuser according to the present invention.

Only the diffuser 5 is shown in FIGS. 2 and 4, to better show the features thereof.

The diffuser 5 is completely transparent and does not comprise non-transparent portions.

As shown in FIGS. 2 and 4, the diffuser 5 comprises a plurality of ridges 5A and a plurality of valleys 5B which mutually alternate.

The valleys 5B and the ridges 5A are substantially parallel to one another, as shown in FIGS. 2 and 4. The valleys 5B and the ridges 5A have a linear, i.e., straight, extension.

In the second embodiment in FIGS. 3 and 4, the valleys 5B have a matt transparent outer surface, while the ridges 5A have a glossy transparent outer surface. The inner surface, i.e., that facing the reflector, is substantially flat and glossy transparent.

In the first embodiment in FIGS. 1 and 2, the ridges 5A have protrusions, referred to as protuberances 5C, which have a prismatic shape. The valleys 5B have a matt transparent outer surface, the ridges 5A have a glossy transparent outer surface, and the protuberances 5C have a matt outer surface. The inner surface, i.e., that facing the reflector, is substantially flat and glossy transparent.

In other words, the matt transparent portions are located on the valleys 5B of the diffuser 5, and the glossy transparent portions are located on the ridges 5A of the diffuser 5. The term "matt transparent" means a surface that is rough to the touch, which while remaining transparent, does not allow distinguishing the details of an object arranged behind the surface, with respect to the observer's point of view.

Conversely, the term "glossy transparent" means a surface that is smooth to the touch, which is transparent and allows distinguishing the details of an object arranged behind the surface, with respect to the observer's point of view.

The protuberances 5C shown in FIGS. 1 and 2 extend from the ridges 5A and have a prismatic shape which tapers proceeding outwards, i.e., away from the ridges 5A.

The diffuser 5 comprises a plurality of hooks 5D projecting from the rear side of the diffuser 5, as shown in FIGS. 1-4. These hooks 5D are configured to interlock with appropriate holes 4D in the reflector 4. Alternatively, the diffuser 5 can be configured to connect to the casing 2.

The lamp 1 further comprises a clear cover 6 which is shaped to fully cover the front aperture 2A of the casing 2. The clear cover 6 is sealed to the casing 2 so as to ensure a watertight seal at the front part.

Once the clear cover 6 closes the casing 2, the diffuser 5, the reflector 4, and the light source 3 remain sandwiched in the space defined between the casing 2 and the clear cover 6.

Figure 5:
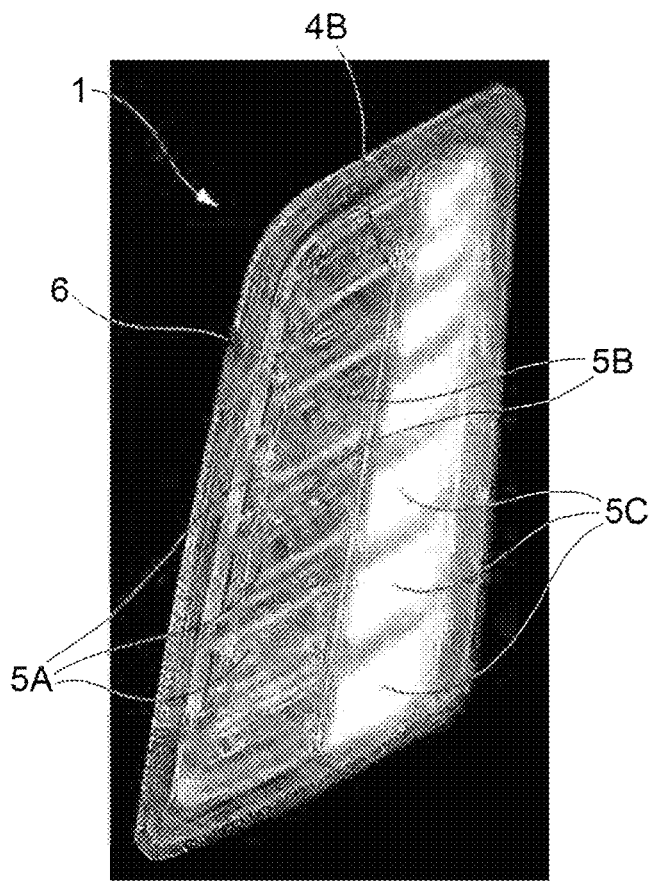
FIG. 5 shows a perspective view of the lamp according to the first embodiment in night lighting conditions.

Finally, referring to FIG. 5, the optical effect generated by the ridges 5A and the protuberances 5C in the dark is shown, specifically when backlit by the light reflected by the reflector 4 and emitted by the light source 3. As can be seen, the point light generated by the light spots 3A of the light source 3 is uniformly diffused on the outer surface of the protuberances 5C, which in turn appear to be light sources. Instead, the number of protuberances 5C (in this case seven) is greater than the number of light spots 3A (in this case, four on the left side of the flat body 3B).

Figure 6:
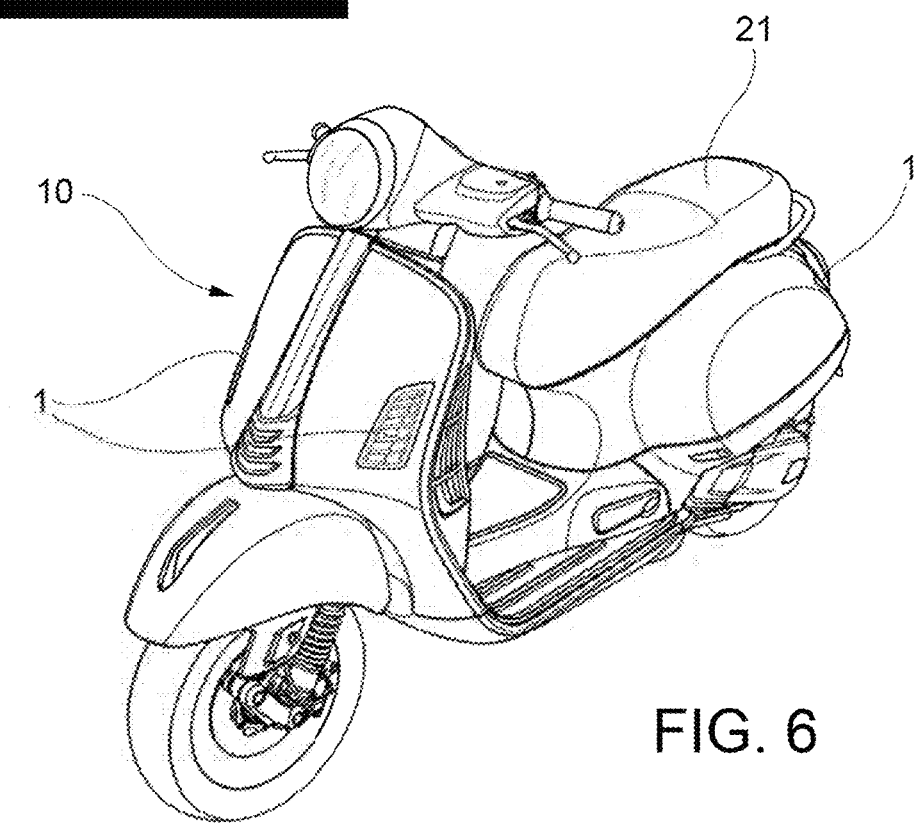
FIG. 6 shows a vehicle equipped with a lamp, in particular a turn signal lamp, according to the present invention.

Finally, referring to FIG. 6 shows a rideable saddle vehicle 10 comprising a plurality of lamps 1 according to the present invention, where said lamps 1 act as front and rear turn signal lamps. In particular, the lamp 1 according to the first embodiment complies with the front turn signal lamps of the motorcycle 10 (shown in FIG. 6), while the lamp 1 according to the second embodiment complies with the rear turn signal lamps of the motorcycle 10 (only partially visible in FIG. 6).

In conclusion, it is apparent that the invention thus devised is susceptible to several modifications or variations, all falling within the invention; moreover, all details are replaceable by technically equivalent elements. In practice, the amounts may be varied according to the technical needs.

REFERENCE NUMERALS 1 lamp
2 casing
2A front aperture (of the casing)
2B inner reflecting surface (of the casing)
2C attaching means (of the casing)
2D hole (of the casing)
3 light source
3A light spot (of the light source)
3B flat body (of the light source)
4 reflector
4A reflecting surface (of the reflector)
4A' first group of reflecting surfaces (of the reflector)
4A" second group of reflecting surfaces (of the reflector)
4B transversal septum (of the reflector)
4C side aperture (of the reflector)
4D holes (of the reflector)
5 diffuser
5A ridge (of the diffuser)
5B valley (of the diffuser)
5C protuberance (of the diffuser ridge)
5D hook (of the diffuser)
6 clear cover
7 electric cables
10 vehicle
11 saddle (of the vehicle)

The invention claimed is:

1. A lamp for a saddle-ride type vehicle comprises:
a casing comprising a front aperture;
a light source attached to the casing;
a reflector configured to reflect light emitted by the light source;
a diffuser arranged in front of the reflector;
a clear cover attached to the casing and configured to define together with the casing a space in which the light source, the reflector and the diffuser are arranged;
wherein the diffuser is shaped to comprise a plurality of ridges and valleys alternated with each other;
wherein the diffuser comprises a transparent material including matt transparent portions and glossy transparent portions;
the matt transparent portions are on the valleys and the glossy transparent portions are on the ridges.

2. The lamp according to claim 1, wherein at least one of the ridges comprises a protuberance shaped to extend outward from the ridge.

3. The lamp according to claim 2, wherein an external surface of the protuberance is matt transparent.

4. The lamp according to claim 2, wherein the protuberance has a tapered shape.

5. The lamp according to claim 2, wherein the protuberance has a prismatic shape.

6. The lamp according to claim 1, wherein the ridges are linear ridges and/or the valleys are linear valleys.

7. The lamp according to claim 1, wherein the light source comprises a plurality of light spots and the reflector comprises a plurality of reflecting surfaces associated to said light spots.

8. The lamp according to claim 7, wherein the light source has a flat body, and the light spots are attached to one side of the flat body or to two opposite sides of the flat body.

9. The lamp according to claim 8, wherein the reflector comprises a transversal septum shaped to separate a first group of reflecting surfaces associated to a first group of light spots from a second group of reflecting surfaces associated to a second group of light spots.

10. The lamp according to claim 9, wherein the first group of light spots is configured to emit a colored light beam and the second group of light spots is configured to emit a white light beam.

11. The lamp according to claim 7, wherein the light spots comprise LEDs, and wherein the light source has a flat body, and the light spots are attached to one side of the flat body or to two opposite sides of the flat body.

12. The lamp according to claim 1, wherein the clear cover is configured to entirely cover and to close the front aperture of the casing in a water-proof manner.

13. The lamp according to claim 1, wherein the casing comprises an inner reflecting surface and attaching means for connecting the lamp to a vehicle.

14. The lamp according to claim 1, wherein the lamp comprises a turn signal lamp.

15. A saddle-ride type vehicle comprising at least one lamp according to claim 1.

* * * * *